United States Patent [19]
Cherubini et al.

[11] Patent Number: 6,061,407
[45] Date of Patent: May 9, 2000

[54] TRANSMISSION METHOD AND APPARATUS EMPLOYING TRELLIS-AUGMENTED PRECODING

[75] Inventors: Giovanni Cherubini, Ruschlikon; Sedat Oelcer, Au; Gottfried Ungerboeck, Langnau, all of Switzerland

[73] Assignee: International Business Machines Corp., Armonk, N.Y.

[21] Appl. No.: 08/947,356

[22] Filed: Oct. 8, 1997

[51] Int. Cl.[7] .............................. H04L 23/02; H04L 5/12
[52] U.S. Cl. ...................... 375/265; 375/262; 714/792; 714/795
[58] Field of Search ................................ 375/265, 262; 714/792, 795

[56] References Cited

U.S. PATENT DOCUMENTS

| | | | |
|---|---|---|---|
| 5,263,051 | 11/1993 | Eyuboglu | 375/254 |
| 5,388,124 | 2/1995 | Laroia et al. | 375/286 |
| 5,418,531 | 5/1995 | Laroia | 341/94 |
| 5,446,758 | 8/1995 | Eyuboglu | 375/259 |
| 5,455,839 | 10/1995 | Eyuboglu | 375/265 |
| 5,488,633 | 1/1996 | Laroia | 375/262 |

*Primary Examiner*—Don Vo
*Assistant Examiner*—Phuong Phu
*Attorney, Agent, or Firm*—Douglas W. Cameron; Anne Vachon Dougherty

[57] ABSTRACT

Trellis-enhanced precoding for trellis-coded transmission over channels with intersymbol interference allows coding and shaping gains to be achieved with minimal transmit power penalty for arbitrary signal constellations, provided the intersymbol interference channels are linearly invertible. This technique can be employed for trellis-coded transmission over a variety of communication channels. However, if the channel response exhibits spectral nulls, trellis-enhanced precoding cannot be applied because the corresponding inverse precoding operation at the receiver requires inverse channel filtering. For channels with a spectral null, this inverse operation can result in unlimited error propagation. The present invention allows trellis-coded transmission over channels exhibiting spectral nulls without incurring unlimited error propagation in the receiver. Coding gains are achieved with minimal transmit power penalty, like in the case of trellis-enhanced precoding. The invention is applicable for most signal sets used in practice.

10 Claims, 6 Drawing Sheets

TRANSMISSION METHOD AND APPARATUS EMPLOYING TRELLIS-AUGMENTED PRECODING

TECHNICAL FIELD

Present invention relates to the transmission of trellis-coded signals over channels with intersymbol interference, and in particular to transmission systems where precoding is employed at the transmitter in combination with trellis coding to obtain at the output of the channel trellis-coded signals that are free of intersymbol interference.

BACKGROUND OF THE INVENTION

Trellis-enhanced precoding for trellis-coded transmission over channels with intersymbol interference allows coding and shaping gains to be achieved with minimal transmit power penalty for arbitrary signal constellations, provided the intersymbol interference channels are linearly invertible. This technique was proposed during the development of the V.34 Recommendation by the International Telecommunications Union-Telecommunications Standardization Sector (ITU-T) for voiceband modems for data transmission over the general switched telephone network (ITU-T Recommendation V.34, "Data communication over the telephone network. A modem operating at data signalling rates of up to 28800 bit/s for use on the general switched telephone network and on leased point-to-point 2-wire telephone-type circuits", September 1994).

Trellis-enhanced precoding can be employed for trellis-coded transmission over a variety of communication channels. However, if the channel response exhibits spectral nulls, trellis-enhanced precoding cannot be applied because the corresponding inverse precoding operation at the receiver requires inverse channel filtering. For channels with a spectral null, this inverse operation can result in unlimited error propagation. One important application where spectral nulls in the transmission channel are encountered is data transmission at rates of several Mbit/s over metallic cables, e.g., over shielded or unshielded twisted-pair cables in office environments. In this case, the line-coupling transformers at both cable ends introduce a spectral null at dc. In addition, spectral nulls or near nulls may be encountered as a result of severe signal attenuation by the cable. Alternatively, spectral nulls may be introduced intentionally by signal shaping filters designed to achieve desired channel response characteristics and/or to comply with regulations for electromagnetic compatibility.

PCM "56 kbit/s" voiceband modems represent another example for equipment in which spectral nulls in the transmission channel prevent the use of state-of-the-art trellis-enhanced precoding. This latest generation of voiceband modems exploits the fact that today's general switched telephone network constitutes an essentially digital network, transporting PCM-encoded voiceband signals, or data, at a rate of 64 kbit/s. If "server" modems are connected digitally to the network, there is only one analog local loop between the "client" modem and the rest of the network. The resulting overall channel is a baseband channel with almost 4 kHz bandwidth, a spectral null at dc, and possibly strong attenuation at 4 kHz. Although precoding in the downstream direction does not appear to be possible because modulation amplitudes must be equal to A/$\mu$ law PCM code levels, a precoding technique that allows transmission over channels with spectral nulls at dc and 4 kHz can be useful for upstream transmission.

Let the response of a discrete-time intersymbol-interference channel with additive noise be $h(D)=1+h_1 D+h_2 D^2 \ldots$ and assume that $h(D)$ is known at the transmitter. Assume further that for any two modulation symbols $a^i \in A$, $a^k \in A$: $a^i \equiv a^k \mod \Lambda_0$ holds, where $A \subset \Lambda_0 + \lambda$ is a finite set of modulation symbols into which information is encoded, $\Lambda_0$ denotes the lattice underlying $A$, and $\lambda$ is a given, possibly non-zero, offset value. The aim of all precoding techniques, without and with coding, is to determine a pre-equalized sequence of transmit signals $x(D)=u(D)/h(D)$ such that, in the absence of noise at the channel output, an apparently intersymbol-interference free sequence of modulation symbols in a subset with elements in $A' \subset \Lambda_0 + \lambda$ is received. To achieve this with channel inputs constrained to a given finite signal region, the set $A'$ must be larger than the set $A$. This output redundancy can then be employed to satisfy the constraint on the channel inputs. It is important that at the receiver an inverse precoding operation can be performed to retrieve from $u(D)$ uniquely the encoded information. In the case of systems employing trellis coded modulation (TCM; cf. G. Ungerboeck, "Channel coding with multilevel/phase signals," *IEEE Trans. Inform. Theory*, vol. IT-28, pp. 55–67, January 1982), the sequence $u(D)$ has to be a valid trellis-code sequence. In a system with precoding, the elements of the transmit signal sequence $x(D)$ do not have to be discrete-valued modulation symbols.

Precoding for intersymbol-interference channels, without and with trellis-coded modulation, was proposed in the following publications:

(a) M. Tomlinson, "New automatic equalizer employing modulo arithmetic," *Electron. Lett.*, vol. 7, pp. 138–139, March 1971

(b) H. Harashima and H. Miyakawa, "Matched transmission technique for channels with intersymbol interference," *IEEE Trans. Commun.*, vol. 30, pp. 774–780, August 1972

(c) M. V. Eyuboglu and G. D. Forney, Jr., "Trellis precoding: Combined coding, precoding and shaping for intersymbol interference channels," *IEEE Trans. Inform. Theory*, vol. 38, pp. 301–314, March 1992.

(d) R. Laroia, S. A. Tretter, and N. Farvardin, "A simple and effective precoding scheme for noise whitening on intersymbol interference channels," *IEEE Trans. Commun.*, vol. 41, pp. 460–463, October 1993.

(e) R. Laroia, "Coding for intersymbol interference channels—Combined coding and precoding," *IEEE Trans. Inform. Theory*, vol. 42, pp. 1053–1061, July 1996.

The first precoding technique, proposed in the first two of the above-mentioned publications, is called Tomlinson-Harashima (TH) precoding and was defined for uncoded systems. TH precoding employs memoryless modulation operations in the transmitter and the receiver to reduce transmit signals and decoded received signals to a finite signal region containing $A$. In principle, TH precoding can work for arbitrary sets of modulation symbols. However, unless it is possible to define a power-efficient modulo extension of the original signal region containing $A$, the advantages of TH precoding will be offset by losses of signal power efficiency. A power-efficient extension exists only if the entire signal space can be "tessellated" with translated and/or rotated versions of the original finite signal region without leaving empty spaces.

A first straightforward application of TH precoding to a system with trellis coding was proposed by Eyuboglu and Forney in the third of the above-mentioned publications. For this scheme it is necessary that a power-efficient modulo extension exists not only for the symbol set $A$, but also for each of the subsets of $\mathcal{A}$ that are obtained by set partitioning of $\mathcal{A}$ and are needed to define trellis-code sequences. This limitation on the permissible shapes of signal sets was overcome by "flexible precoding", proposed by R. Laroia, S. A. Tretter, and N. Farvardin. In flexible precoding, a precoder adds to a sequence a(D) of transmit symbols in $\mathcal{A}$ the smallest "dither" signals for which at the channel output a uniquely decodable symbol sequence u(D), with elements $u_n \in \mathcal{A}$, is obtained. For inverse precoding at the receiver the channel must be linearly invertible, otherwise unlimited error propagation can occur.

When flexible precoding is combined with trellis coding, a transmit power penalty of $\approx \Delta_{\tilde{m}+1}^2/12$ results, where $\Delta_{\tilde{m}+1}$ represents the minimum intra-subset distance (MSSD) at the final partitioning level $\tilde{m}+1$. For small signal sets or deeper levels of subset partitioning, this penalty can significantly lower the effective coding gain. During the development of the V.34 Recommendation in 1993, the transmit power penalty was reduced to $\Delta_0^2/12$ by "trellis-enhanced precoding". For briefly describing this technique, let the first-level subsets of $\mathcal{A}$ be $\mathcal{B}_0$ and $\mathcal{B}_1$, with MSSD $\Delta_1$. At time n, let $y_n^0 \in \{0,1\}$ denote a trellis-code state bit that determines membership of the next valid code symbol either in $\mathcal{B}_0$ or $\mathcal{B}_1$. With trellis-enhanced precoding, which represents a combination of "flexible precoding" with feedback TCM encoding, trellis encoding is performed in two steps. In the first step, information is encoded into a transmit signal composed of a modulation symbol $a_n \in \mathcal{B}_0$ or $a_n \in \mathcal{B}_1$ and a smallest dither signal such that at the channel output a signal $u_n \in \mathcal{B}_{y_n^0}$ is obtained. The signal $u_n$ represents a valid continuation of the sequence u(D) from the given TCM state at time n. In the second "feedback" step, the encoder determines from $u_n$ the next TCM state at time n+1. This technique is described in the fifth of the above-mentioned publications.

A method to combat error propagation in the receiver of a transmission system using trellis-enhanced precoding for a channel with spectral nulls was proposed by G. Cherubini, S. Ölçer, and G. Ungerboeck in "Increasing margins for 100BASE-T2: Introducing Trellis Coding," Contribution to IEEE 802.3 100BASE-T2 Task Force, Maui, Hi., Jul. 9–12, 1995. The method is based on the knowledge that, at time n, the element $X_n$ of the sequence x(D) of transmit signals is confined to a well-defined signal region $X_{y_n^0}$. This notation indicates that the signal regions depend on whether the symbol $a_n \in \mathcal{B}_{y_n^0}$ is taken from subset $\mathcal{B}_0$ or $\mathcal{B}_1$. When during inverse precoding the obtained estimated transmit signal $\hat{x}_n$ exceeds the region $X_{\hat{y}_n^0}$, clearly error propagation occurs. In this case, $\hat{x}_n$ is limited to the region to which the actually transmitted signal is confined, i.e., $\hat{x}_n$ is replaced by a new signal value that represents the orthogonal projection of $\hat{x}_n$ onto the contour of the region $X_{\hat{y}_n^0}$.

A similar, but not identical method was described in the publications by R. Fischer and J. Huber, "Comparison of precoding schemes for digital subscriber lines," *IEEE Trans. Commun.*, vol. 45, pp. 334–343, March 1997 and by R. Fischer, "Using flexible precoding for channels with spectral nulls," *IEE Electronics Letters*, vol. 31, pp. 356–358, 2nd March 1995,

OBJECTS OF THE INVENTION

It is the object of the invention to devise a transmission system for realizing joint trellis coding and precoding to obtain intersymbol-interference free trellis-coded channel-out-put signals.

This object is achieved by a method and apparatus as specified in claims 1 and 6. The devised system presents the advantage that trellis-coded transmission becomes possible over channels exhibiting spectral nulls, without incurring unlimited error propagation in the receiver. Coding gains are achieved with minimal transmit power penalty, like in the case of trellis-enhanced precoding. The invention is applicable for most signal sets used in practice.

LIST OF DRAWINGS

The principle of the invention and a specific embodiment are described here in detail with reference to the following drawings:

FIG. 1: Block diagram of a transmission system employing trellis-augmented precoding according to the invention.

FIG. 2: Block diagram of a specific embodiment of the system in FIG. 1 for an 8-state trellis code and a 6×6-point signal set.

FIGS. 3A and 3B: Encoder and trellis diagram of an 8-state trellis code to be employed in the system in FIG. 2.

FIG. 4: Symbol mapping and set partitioning for a 6×6-point signal set, as used in the system in FIG. 2.

FIG. 5: Illustration of signal and lattice points, and signal regions, for the invented trellis-augmented precoding with a 2-dimensional 6×6-point signal set.

FIG. 6: Inverse mapping for a 2-dimensional 6×6-point signal set, as used in the system in FIG. 2.

DETAILED DESCRIPTION

The principles of the invention, which can be designated as "trellis-augmented precoding", will be described with reference to FIG. 1. A specific embodiment is illustrated in FIG. 2.

Figure 1:
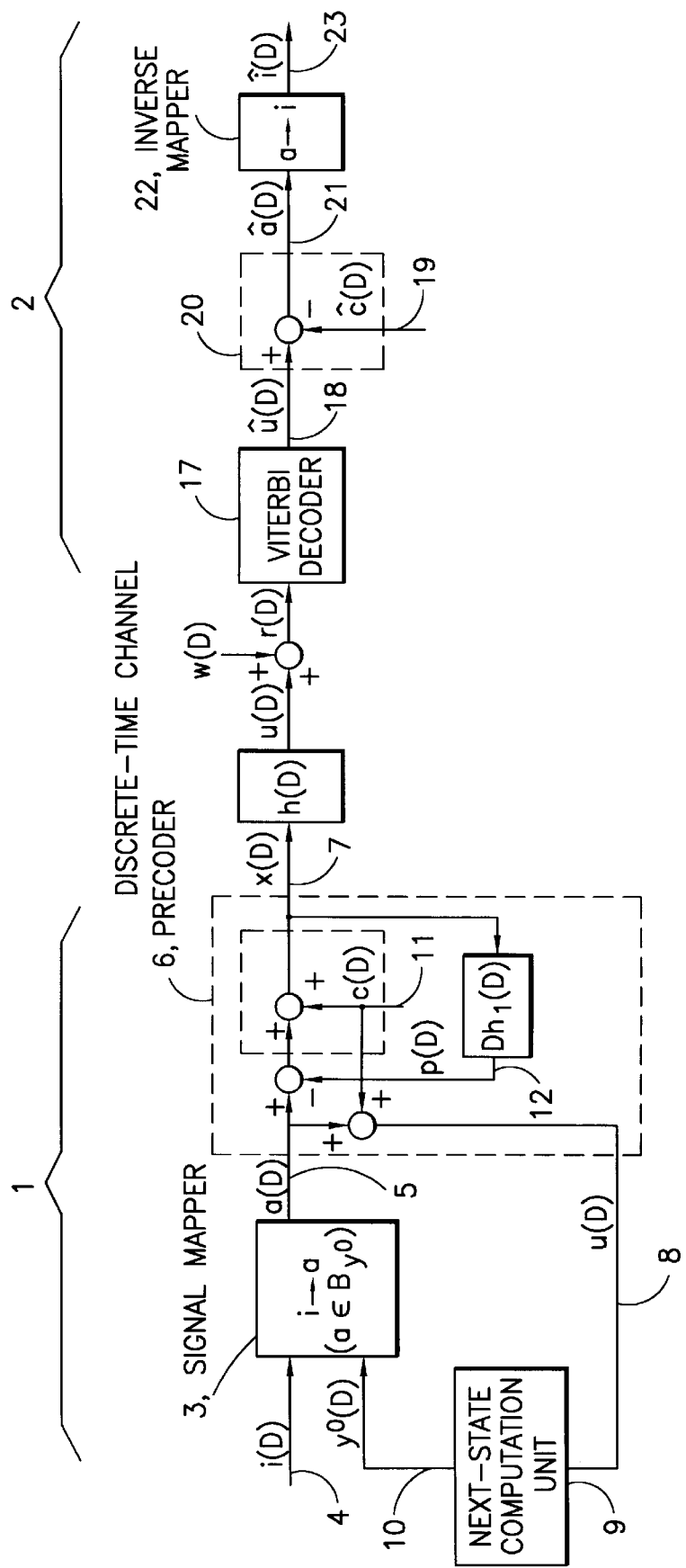
Figure 2:
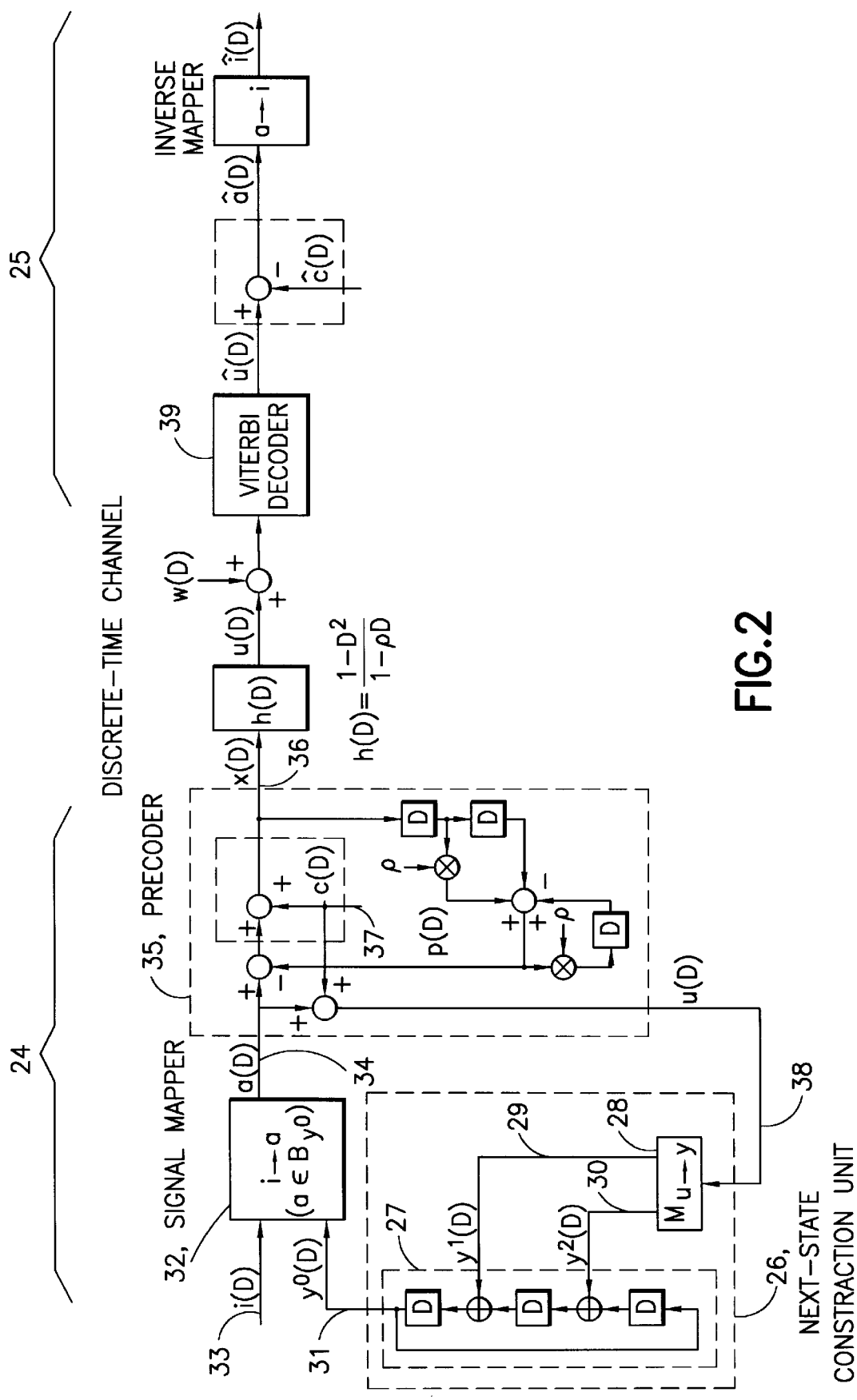

A system for trellis-coded transmission over channels with intersymbol interference that employs the invention is depicted in FIG. 1. It includes on the transmitter side encoding means 1 and on the receiver side decoding means 2. Transmission takes place over a discrete-time channel with transfer characteristic $h(D) \triangleq 1 + Dh_1(D)$ and additive noise represented by w(D).

Encoding means 1 comprises a signal mapper 3 which converts an input vector sequence of information bits i(D) provided on line 4 into an output symbol sequence a(D) on line 5, under control of a binary state-bit sequence $y^0(D)$. It includes furthermore a precoder 6, which generates from the symbol sequence a(D) a sequence of channel input signals x(D) on line 7, and which also provides a trellis-coded sequence u(D) on line 8. A next-state computation unit 9 is provided to generate, in response to the trellis-coded sequence u(D), the binary state-bit sequence $y^0(D)$ on line 10. The next-state computation unit comprises storage means to store the trellis code state.

The symbol sequence a(D) has elements $a_n \in \mathcal{A}$, where $\mathcal{A} \subset \Lambda_0 + \lambda$ is a set of M×M modulation symbols, M being even, which admits a power-efficient modulo extension, $\Lambda_0$ denotes the lattice underlying $\mathcal{A}$, and $\lambda$ is a given, possibly non-zero, offset value. The element $a_n$ at time n is taken from $\mathcal{B}_{y_n^0}$, i.e., one of the two first-level subsets $\mathcal{B}_0$ or $\mathcal{B}_1$ of $\mathcal{A}$, as specified by the value $y_n^0 = 0$ or 1 of the element of the binary state-bit sequence $y^0(D)$ at time n.

Precoding means 6 determines the sequence of channel input signals x(D) according to $$x(D)=a(D)-p(D)+c(D), \quad (1)$$

where the sequence $$p(D)=[h(D)-1]x(D)=Dh_1(D)x(D) \quad (2)$$

on line 12 represents the intersymbol interference at the channel output, which needs to be compensated at the transmitter. The elements of the sequence c(D) are provided on input 11 and are points of the lattice $\Lambda_x$ underlying the power-efficient modulo extension of $\mathcal{A}$. The value $c_n \epsilon \Lambda_x$ of the element of the sequence c(D) at time n is chosen such that the power of the channel input signal $x_n$ is minimized. Precoding means 6 furthermore determines the trellis-coded sequence u(D) according to $$u(D)=a(D)+c(D). \quad (3)$$

Note that the signal x(D) can be expressed as $$x(D) = \frac{u(D)}{h(D)}. \quad (4)$$

Therefore, in the case of a noiseless channel, the channel output signal sequence is given by u(D), whose element at time n is $u_n \equiv a_n \mod \Lambda_x$.

To allow correct decoding operations, the signal $u_n$ must represent a valid continuation of the sequence u(D) from the current TCM state at time n. This condition is satisfied by employing the concept of feedback trellis encoding. The trellis-coded sequence u(D) is input to the next-state computation unit 9, where $u_n$ is used to determine the next TCM state at time n+1. The next-state computation unit generates the binary state-bit sequence $y^0(D)$, where $y_n^0 \epsilon \{0, 1\}$ denotes the TCM state bit at time n, allowing the elements of a(D) to be selected such that u(D) is a valid trellis-coded sequence.

In general, the channel output signal, which is input to the receiver, is given by r(D)=u(D)+w(D), where w(D) represents a sequence of additive noise samples. Decoding means 2 in the receiver comprises a Viterbi decoder 17 to realize sequence detection using the received noisy trellis-coded sequence r(D). The Viterbi decoder yields the estimated symbol sequence û(D) on output 18. It furthermore comprises means 20 to generate an estimated symbol sequence â(D) on output 21, given by the memoryless operation $$â(D)=û(D)-ĉ(D). \quad (5)$$

Error propagation in the receiver is therefore completely avoided. The elements of the sequence ĉ(D) are provided on input 19 and are points of the lattice $\Lambda_x$. The value of the element $ĉ_n \epsilon \Lambda_x$ at time n is chosen such that the signal $â_n=û_n-ĉ_n$ is a signal point in the set $\mathcal{A}$. Also provided in decoding means 2 is means 22 for determining an inverse mapping of the sequence â(D) giving on output 23 an estimate î(D) of the vector information sequence i(D).

The transmission system shown in FIG. 2 is a specific example of the invented transmission system depicted in general in FIG. 1. FIG. 2 shows the case of an 8-state trellis code and a 6×6-point signal set. It includes on the transmitter side encoding means 24 and on the receiver side decoding means 25. The channel response is assumed to exhibit spectral nulls at dc and at half of the modulation rate and is given by $$h(D) = \frac{1-D^2}{1-\varrho D}$$

where $0 \leq \varrho \leq 1$. Encoding means 24 includes a next-state computation unit 26, a signal mapper 32, and a precoder 35. The next-state computation unit 26 comprises inverse mapping means 28 and a systematic encoder 27 for an 8-state rate-⅔ convolutional code.

The system in FIG. 2 will now be explained in detail with further reference to FIGS. 3A, 3B, 4, 5, and 6.

Figure 3A:
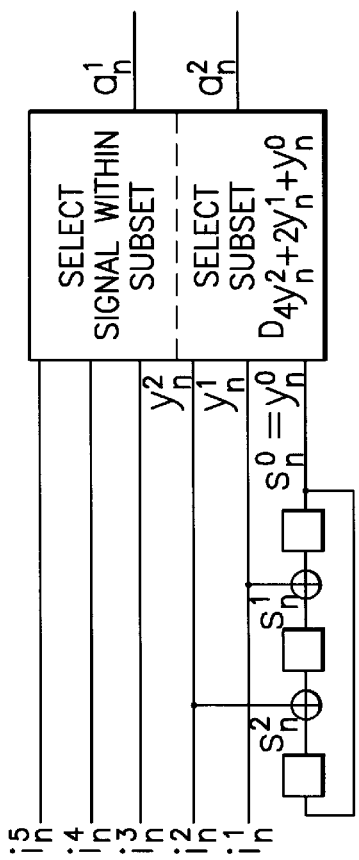
Figure 3B:
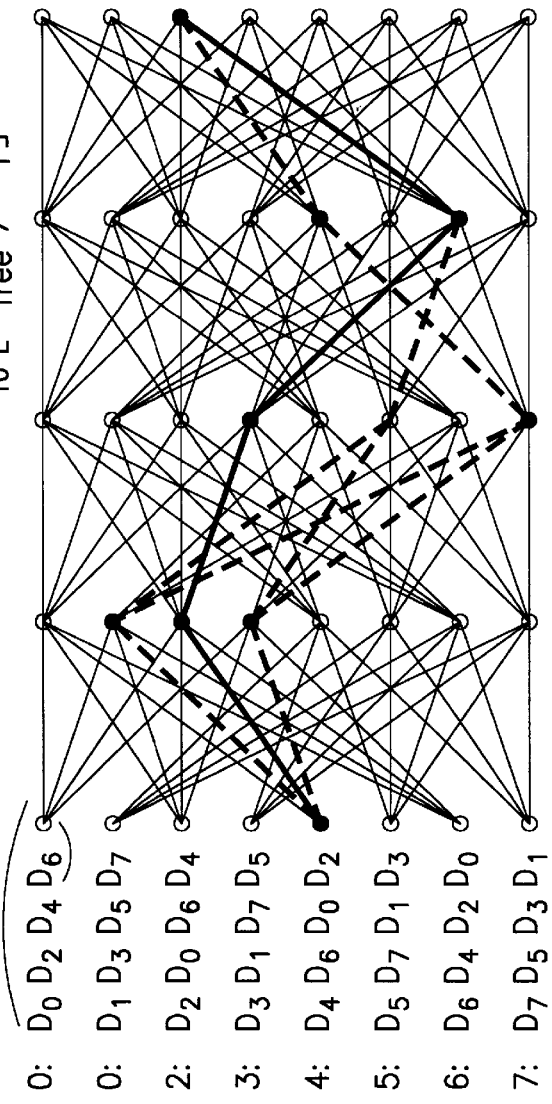
Figure 4:
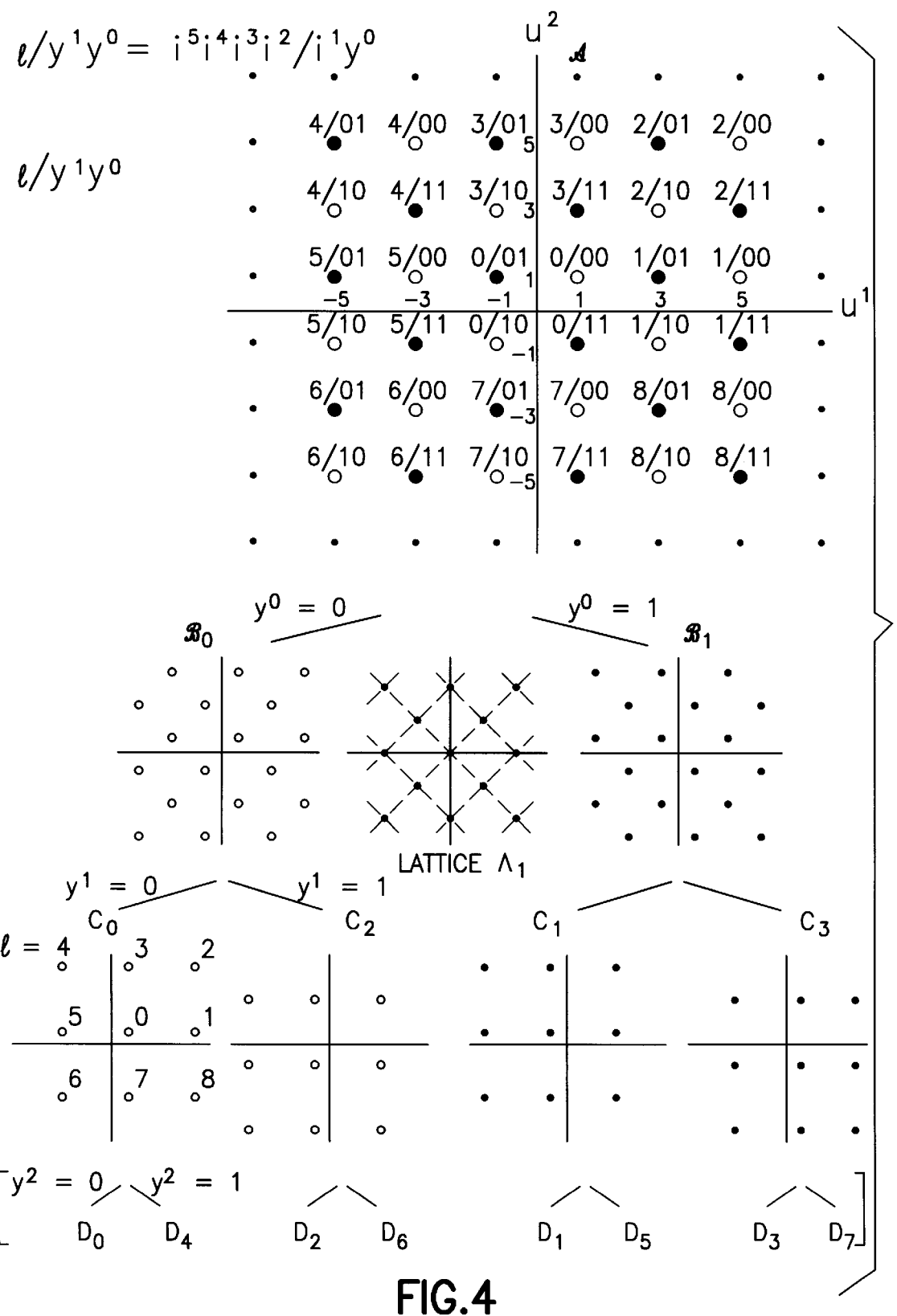

FIG. 3A shows a conventional encoder for an 8-state trellis code employing a systematic encoder for a rate-⅔ convolutional code followed by a signal mapper, and FIG. 3B illustrates the trellis diagram of the 8-state trellis code. Minimum-distance error events are also shown in the trellis diagram. The two-dimensional 6×6-point signal constellation $\mathcal{A}$ and the set partitioning that yields the signal subsets associated with the transitions on the trellis diagram are illustrated in FIG. 4.

The signal mapper 32 encodes the vector sequence of information bits i(D) into a sequence a(D) with elements $a_n \epsilon \mathcal{A}$. The mapping of information bits $i_n=(i_n^5, \ldots, i_n^1) \epsilon \{(00000),(00001), \ldots, (10001)\}$ into signals $a_n \epsilon \mathcal{B}_{y_n^0}$, where $y_n^0 \epsilon \{0,1\}$, is illustrated in FIG. 4. The element $a_n$ at time n is selected from $\mathcal{B}_{y_n^0}$, i.e., one of the two first-level subsets $\mathcal{B}_0$ or $\mathcal{B}_1$ of $\mathcal{A}$ also shown in FIG. 4, as specified by the value $y_n^0=0$ or 1 at time n of the element of the binary state-bit sequence $y^0(D)$ at the output 31 of the next-state computation unit 26.

Precoding means 35 determines the sequence of channel input signals x(D) according to $$x(D)=a(D)-p(D)+c(D), \quad (6)$$

where $$p(D) = [h(D)-1] \times (D) = D\frac{\varrho-D}{1-\varrho D} \times (D).$$

Figure 5:
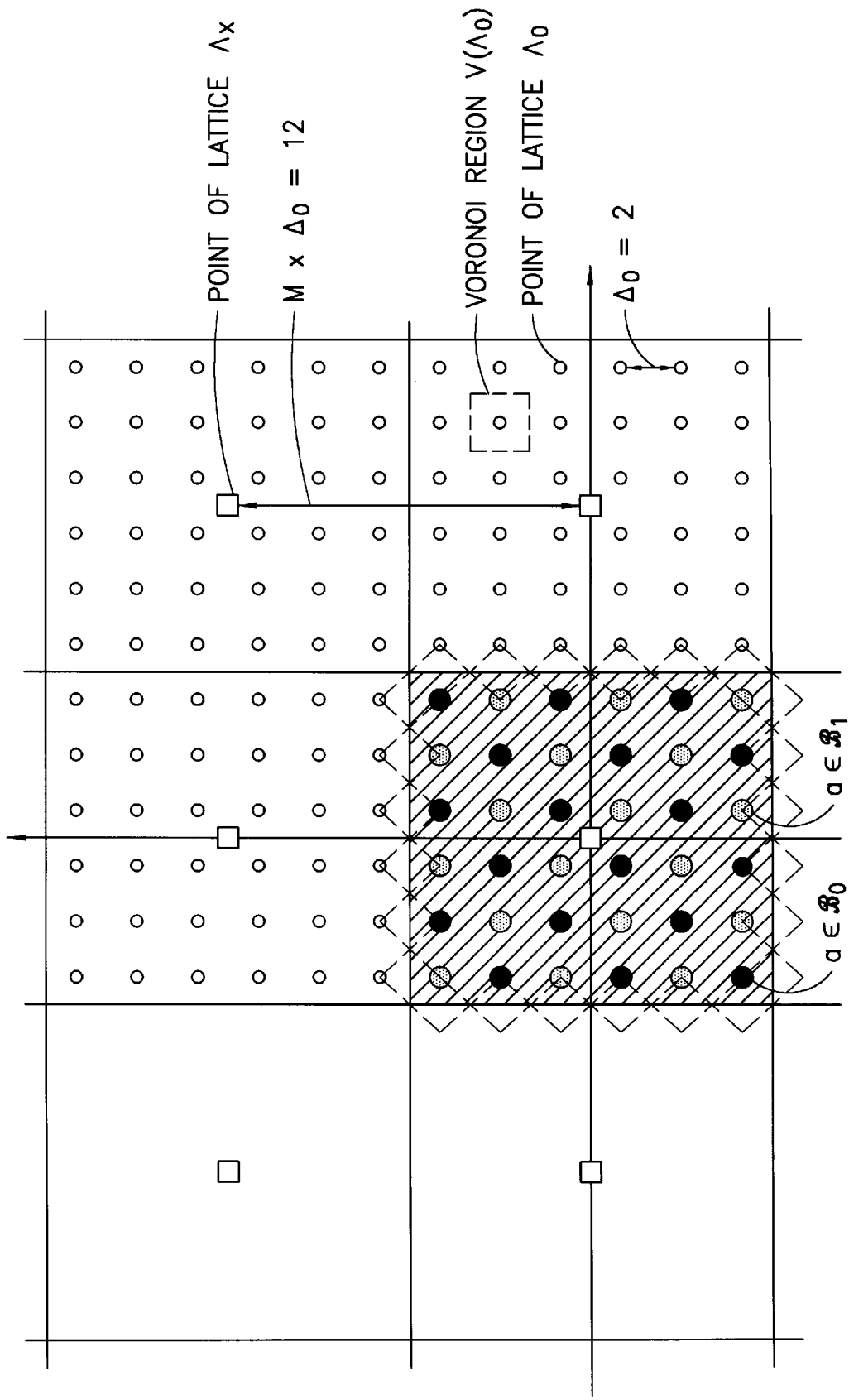

The elements of the sequence c(D) are provided on input 37 and are points of the lattice $\Lambda_x$ underlying the power-efficient modulo extension of $\mathcal{A}$ illustrated in FIG. 5. The value of the element $c_n \epsilon \Lambda_x$ at time n is chosen such that the power of the channel input signal $x_n$ is minimized. Precoding means 35 furthermore determines a symbol sequence u(D) on output 38, which represents a valid trellis-coded sequence at the output of a noiseless channel with the above-defined response h(D), given by $$u(D)=a(D)+c(D), \quad (7)$$

which is fed to the next-state computation unit 26.

Figure 6:
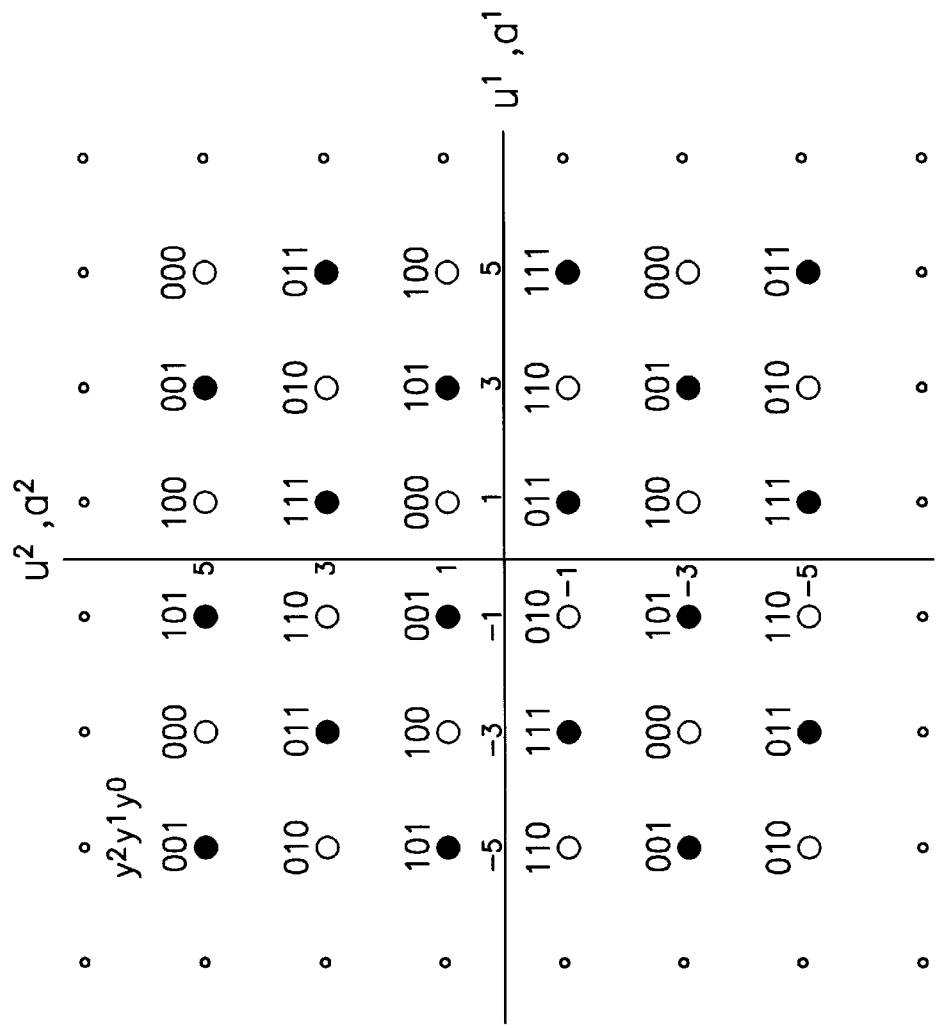

Means 28 in the next-state computation unit 26 determines an inverse mapping of the sequence u(D), yielding a pair of binary sequences $y^1(D)$ and $y^2(D)$ appearing on lines 29 and 30. The inverse mapping $M_{u \to y}$ is illustrated in FIG. 6.

The binary sequences $y^1(D)$ and $y^2(D)$ are input to the systematic encoder 27 for the rate-⅔ convolutional code. At each modulation interval nT, the encoder computes from the values of the bits $y_n^1$ and $y_n^2$ the next encoder state and outputs bit $y_{n+1}^0$ on line 31, so that the signal mapper 32 generates a symbol $a_{n+1}$ that results in a valid continuation of the trellis-coded sequence u(D) on line 38.

The Viterbi decoder 39 outputs an estimate û(D) of the sequence u(D). An estimate â(D) of the sequence a(D) is given by the memoryless operation $$â(D)=û(D)-ĉ(D). \quad (8)$$

The sequence of information bits î(D) is finally recovered from the sequence â(D).

Interest in the 6×6-point signal constellation stemmed from the requirement that in a Fast Ethernet system, in addition to 4-bit data "nibbles", Ethernet-specific control information must be conveyed without resorting to variable-length coding. With a 6×6-point constellation, it is possible to encode sequences of symbols that represent either a 4-bit data nibble or one out of two distinct control symbols.

The assumption of perfectly known channel characteristics only holds in an ideal case. For example, if the proposed method is applied to dual-duplex baseband data transmission at 100 Mbit/s over unshielded telephone-grade twisted-pair cables in office building environments, low-frequency disturbances and alien near-end crosstalk at higher frequencies are the main impairments. In this case, it is not practical to convey to the transmitter information about the channel. The overall system must therefore be designed for the worst-case channel characteristics, and deviations from the assumed characteristics can be compensated at the receiver by adaptive means.

What is claimed is:

1. Method for transmission of trellis-coded signals over channels with intersymbol interference, comprising the following steps:

encoding a vector sequence of information bits i(D) into a symbol sequence a(D) with elements chosen from a set $\mathcal{A}$ under control of a binary state-bit sequence $y^0(D)$ consisting of elements $y_n^0$, the encoding operation being determined by a current trellis-code state at each time n;

determining, in response to said symbol sequence a(D),
(a) a sequence of channel input signals x(D) given by $$x(D)=a(D)-p(D)+c(D),$$

where the sequence p(D) represents the intersymbol interference at an output of a channel with given response h(D), and the sequence c(D) is a sequence with elements chosen from a lattice $\Lambda_x$ underlying a power-efficient modulo extension of $\mathcal{A}$ such that the power of said sequence x(D) is minimized, and (b) a trellis-coded sequence u(D) consisting of elements $u_n$ according to $$u(D)=a(D)+c(D)$$

which represents a valid trellis-coded sequence at the output of a noiseless channel with said response h(D); and determining by next-state computation at each time n, from the element $u_n$ of said trellis-coded sequence u(D) and from the current trellis-code state, a next trellis-code state and the state-bit $y_{n+1}^0$ at time n+1, so that a valid continuation of said trellis-coded sequence u(D) is achieved.

2. The method of claim 1, wherein the sequence p(D) is generated as $$p(D)=h(D)-1x(D)=Dh_1(D)x(D),$$

where $h(D)=h_0+h_1D+h_2D^2+ \ldots =1+Dh_1(D)$ is said given channel response, and wherein the sequence c(D) is generated as $$c(D)=-Q_{\Lambda_x}\{a(D)-p(D)\},$$

where $Q_{\Lambda_x}$ denotes quantization to the closest point of said lattice $\Lambda_x$.

3. The method of claim 1, wherein said next-state computation operation in the step for determining the next trellis-code state and the state-bit $y_{n+1}^0$ includes:

an inverse mapping operation that generates from said element $u_n$ of said trellis-coded sequence u(D) at time n a binary vector $$\{y_n^{\tilde{m}}, y_n^{\tilde{m}-1}, \ldots, y_n^1, y_n^0\}$$

that labels the subset of said signal set $\mathcal{A}$ to which said symbol $u_n$ belongs, where $\tilde{m}+1$ is a number of partitioning levels for the trellis code; and a systematic encoding operation based on a rate $\tilde{m}/(\tilde{m}+1)$ convolutional code associated with the trellis code, that employs at time n a binary vector $$\{y_n^{\tilde{m}}, y_n^{\tilde{m}-1}, \ldots, y_n^1\}$$

to generate a binary element $y_{n+1}^0$ of said binary feedback sequence $y^0(D)$ for the vector sequence encoding operation at time n+1.

4. The method of claim 1 further comprising following steps for signal reception:

a Viterbi decoding operation to realize sequence detection using received noisy trellis-coded signals u(D)+w(D), yielding an estimated symbol sequence û(D);

generating an estimated symbol sequence â(D) according to $$â(D)=û(D)-ĉ(D)$$

where the elements of the sequence ĉ(D) are points of the lattice $\Lambda_x$, and the value of an element $ĉ_n \in \Lambda_x$ at time n is chosen such that a symbol $â_n=û_n-ĉ_n$ is a point in said signal set $\mathcal{A}$; and determining an inverse mapping of said sequence â(D) yielding an estimate î(D) of said vector sequence i(D).

5. The method of claim 4, wherein the sequence ĉ(D) is generated as $$ĉ(D)=Q_{\Lambda_x}\{û(D)\},$$

where $Q_{\Lambda_x}$ denotes quantization to the closest point of said lattice $\Lambda_x$.

6. Transmitting apparatus for transmission of trellis-coded signals over channels with intersymbol interference, comprising encoding means that includes:

a signal mapper for encoding a vector sequence of information bits i(D) into a symbol sequence a(D) with elements chosen from a set $\mathcal{A}$ under control of a binary state-bit sequence $y^0(D)$;

preceding means for determining, in response to said symbol sequence a(D),
(a) a sequence of channel input signals x(D) given by $$x(D)=a(D)-p(D)+c(D),$$

where the sequence p(D) represents the intersymbol interference at an output of a channel with given response h(D), and the sequence c(D) is a sequence with elements chosen from a lattice $\Lambda_x$ underlying a power-efficient modulo extension of $\mathcal{A}$ such that the power of said sequence x(D) is minimized;

(b) a symbol sequence u(D) according to $$u(D)=a(D)+c(D)$$

which represents a valid trellis-coded sequence at the output of a noiseless channel with said response h(D);

a next-state computation means receiving said symbol sequence u(D) and determining said binary state-bit sequence $y^0$(D); and means for conveying said binary state-bit sequence $y^0$(D) to said signal mapper.

7. The apparatus of claim 6, comprising means for generating the sequence p(D) as $$p(D)=h(D)-1x(D)=Dh_1(D)x(D),$$

where $h(D)=h_0+h_1D+h_2D^2+ \ldots =1+Dh_1(D)$ is said given channel response, and means for generating the sequence c(D) as $$c(D)=-Q_{\Lambda_x}\{a(D)-p(D)\},$$

where $Q_{\Lambda_x}$ denotes quantization to the closest point of said lattice $\Lambda_x$.

8. The apparatus of claim 6, wherein said next-state computation means includes:

an inverse mapper $M_{u \to y}$ that generates from an element $u_n$ of said symbol sequence u(D) at time n a binary vector $$\{y_n^{\tilde{m}}, y_n^{\tilde{m}-1}, \ldots, y_n^1, y_n^0\}$$

that labels the subset of said signal set $\mathcal{A}$ to which said symbol $u_n$ belongs, where $\tilde{m}+1$ is a number of partitioning levels for the trellis code; and a systematic encoder for a rate $\tilde{m}/(\tilde{m}+1)$ convolutional code associated with the trellis code, that employs at time n a binary vector $$\{y_n^{\tilde{m}}, y_n^{\tilde{m}-1}, \ldots, y_n^1\}$$

to generate a binary element $y_{n+1}^0$ of said binary state-bit sequence $y^0$(D) that is input to said signal mapper at time n+1.

9. Receiving apparatus suited for use with the transmitting apparatus of claim 6 comprising decoding means that includes:

a Viterbi decoder to realize sequence detection using received noisy trellis-coded signals u(D)+w(D), yielding an estimated symbol sequence û(D);

means to generate an estimated symbol sequence â(D) according to $$\hat{a}(D)=\hat{u}(D)-\hat{c}(D)$$

where the elements of the sequence ĉ(D) are points of the lattice $\Lambda_x$, and the value of an element $\hat{c}_n \in \Lambda_x$ at time n is chosen such that a symbol $\hat{a}_n = \hat{u}_n - \hat{c}_n$ is a point in said signal set $\mathcal{A}$; and means for determining an inverse mapping of said sequence â(D) yielding an estimate î(D) of said vector sequence i(D).

10. The apparatus of claim 9, comprising means for generating the sequence ĉ(D) as $$\hat{c}(D)=Q_{\Lambda_x}\{\hat{u}(D)\},$$

where $Q_{\Lambda_x}$ denotes said quantization to the closest point of said lattice $\Lambda_x$.

* * * * *